US012377439B2

(12) United States Patent
Sakai

(10) Patent No.: US 12,377,439 B2
(45) Date of Patent: Aug. 5, 2025

(54) MULTI-LAYER COATING FILM FORMING METHOD

(71) Applicant: KANSAI PAINT CO., LTD., Hyogo (JP)

(72) Inventor: Kenji Sakai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/030,375

(22) PCT Filed: Jul. 6, 2021

(86) PCT No.: PCT/JP2021/025415

§ 371 (c)(1),
(2) Date: Apr. 5, 2023

(87) PCT Pub. No.: WO2022/079958

PCT Pub. Date: Apr. 21, 2022

(65) Prior Publication Data

US 2023/0278071 A1 Sep. 7, 2023

(30) Foreign Application Priority Data

Oct. 13, 2020 (JP) ................................ 2020-172405

(51) Int. Cl.
*B05D 7/00* (2006.01)

(52) U.S. Cl.
CPC .......... *B05D 7/572* (2013.01); *B05D 2601/08* (2013.01)

(58) Field of Classification Search
CPC ............ B05D 7/56; B05D 7/57; B05D 7/572
See application file for complete search history.

(56) References Cited

U.S. PATENT DOCUMENTS 9,404,010 B2 * 8/2016 Iwata ................ C08G 18/8064
9,737,906 B2 * 8/2017 Fujii ....................... B05D 7/14
(Continued)

FOREIGN PATENT DOCUMENTS

CA 3 088 498 7/2019
CN 102811822 12/2012
(Continued)

OTHER PUBLICATIONS

International Search Report issued Sep. 7, 2021 in International (PCT) Application No. PCT/JP2021/025415.

*Primary Examiner* — Michael P Wieczorek
(74) *Attorney, Agent, or Firm* — Wenderoth, Lind & Ponack, L.L.P.

(57) ABSTRACT

An object to be solved by the present invention is to provide a multilayer coating film forming method by which a multilayer coating film having reduced nonuniformity and exhibiting excellent luster and high flip-flop properties can be formed. The present invention provides a multilayer coating film forming method characterized by including: applying an aqueous first colored paint (X) containing a color pigment (x1) and an effect pigment (x2) on an object to be coated to form a first colored coating film; applying an aqueous second colored paint (Y) containing a viscosity modifier (y1), a color pigment (y2), and an effect pigment (y3) to form a second colored coating film; applying a clear paint (Z) to form a clear coating film; and curing by heating, wherein a solid content of the aqueous second colored paint (Y) is in a range of 0.1 to 6 mass %, an average value of light transmittance of the second colored coating film is 1% or lower, and a difference |R(X)−R(S)| between an average value of light reflectance of the first colored coating film and an average value of light reflectance of the multilayer coating film is 5% or lower.

6 Claims, 1 Drawing Sheet

(56) References Cited

U.S. PATENT DOCUMENTS

| | | | | |
|---|---|---|---|---|
| 2019/0001370 | A1* | 1/2019 | Itoh .................... | C09D 201/00 |
| 2019/0023938 | A1 | 1/2019 | Kurashina et al. | |
| 2019/0092947 | A1 | 3/2019 | Yamane et al. | |
| 2020/0061668 | A1 | 2/2020 | Omura et al. | |
| 2020/0238333 | A1 | 7/2020 | Itoh et al. | |
| 2020/0338591 | A1 | 10/2020 | Sakai et al. | |
| 2021/0205844 | A1 | 7/2021 | Imanaka et al. | |

FOREIGN PATENT DOCUMENTS

| | | |
|---|---|---|
| CN | 108883434 | 11/2018 |
| CN | 110402169 | 11/2019 |
| CN | 111093841 | 5/2020 |
| JP | 63-272544 | 11/1988 |
| JP | 2007-167720 | 7/2007 |
| JP | 2009-155537 | 7/2009 |
| JP | 2016-185527 | 10/2016 |
| WO | 2017/175468 | 10/2017 |
| WO | 2018/061217 | 4/2018 |
| WO | 2019/139138 | 7/2019 |

* cited by examiner

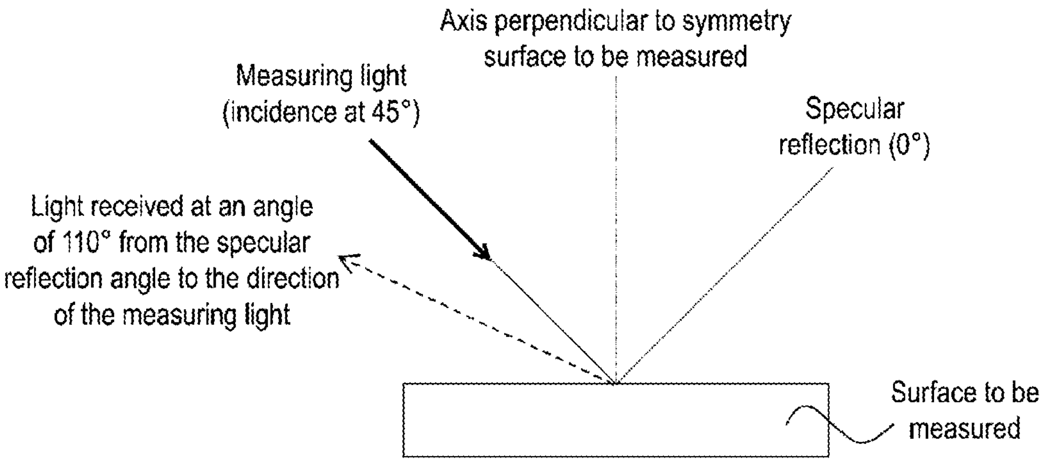
Axis perpendicular to symmetry
surface to be measured
Measuring light
(incidence at 45°)
Specular
reflection (0°)
Light received at an angle
of 110° from the specular
reflection angle to the direction
of the measuring light
Surface to be
measured

MULTI-LAYER COATING FILM FORMING METHOD

CROSS REFERENCE TO RELATED APPLICATION

The present application claims priority based on JP 2020-172405 filed on Oct. 13, 2020 (the entire disclosure of which is incorporated herein by reference). The present invention relates to a multilayer coating film forming method.

TECHNICAL FIELD

Background Art

The purpose of applying paint is mainly to protect a material and to impart aesthetic appearance. For industrial products, aesthetic appearance, especially "texture", is important from the viewpoint of increasing the product appeal. Textures of industrial products desired by consumers are diverse, but in recent years, lustrous feels, such as metal-like and pearl-like lustrous feels, are in demand in the fields, such as automobile outer panels, automobile parts, and home electrical appliances (hereinafter the metal-like lustrous feel and pearl-like lustrous feel will be collectively described as "metallic or pearly luster". In the present specification, the lustrous feels including the metal-like lustrous feel and pearl-like lustrous feel may be represented simply as luster).

Here, the luster (such as the metallic luster and pearly luster) is a texture characterized in that a coated plate shines brilliantly as viewed in the vicinity of specularly reflected light (highlight) but presents dark as viewed in an oblique direction, that is, there is a large luminance difference between the highlight area and the shade area.

Techniques to impart such metallic or pearly luster to the surface of industrial products include metal plating processing and metal vapor deposition processing (e.g., Patent Literature 1). However, if a paint can provide metallic or pearly luster, it is advantageous from the viewpoints of ease of operation, cost, and the like, and if the paint is aqueous, it is further advantageous from the viewpoint of environmental load.

Patent Literature 2 discloses an aqueous base paint composition characterized by containing an effect pigment obtained by grinding a vapor-deposited metal film into metal pieces and an aqueous cellulose derivative with an acid value of 20 to 150 mg KOH/g (solid content), in which the aqueous cellulose derivative is a main binder resin, and a content of the effect pigment is from 20 to 70 mass % in terms of PWC.

However, the coating film formed from the paint described in Patent Literature 2 has insufficient metallic or pearly luster.

Patent Literature 3 discloses an effect pigment dispersion containing water, a flaky aluminum pigment, and a cellulose-based rheology control agent, in which the effect pigment dispersion contains from 0.1 to 10 parts by mass of solids based on 100 parts by mass of all components of the effect pigment dispersion, a viscosity measured using a B-type viscometer is in a range of 400 to 10000 mPa·sec under a condition of a rotational speed of 6 revolutions/min, and the solid content of the flaky aluminum pigment is from 30 to 200 parts by mass based on 100 parts by mass of a total amount of components other than the flaky aluminum pigment in total solids content.

The effect pigment dispersion described in Patent Literature 3 has excellent metallic luster, but in recent years, coating films with reduced nonuniformity have been further in demand.

CITATION LIST

Patent Literature

Patent Literature 1: JP 63-272544 A Patent Literature 2: JP 2009-155537 A Patent Literature 3: WO 2017/175468

SUMMARY OF INVENTION

Technical Problem

An object of the present invention is to provide a method that can form a multilayer coating film having reduced nonuniformity and exhibiting excellent luster and high flip-flop properties.

Solution to Problem

The present invention encompasses the subject matter described in the following items.

Item 1. A multilayer coating film forming method characterized by including:

(1) applying an aqueous first colored paint (X) containing a color pigment (x1) and an effect pigment (x2) on an object to be coated to form a first colored coating film;

(2) applying an aqueous second colored paint (Y) containing a viscosity modifier (y1), a color pigment (y2), and an effect pigment (y3) on the first colored coating film to form a second colored coating film;

(3) applying a clear paint (Z) on the second colored coating film to form a clear coating film; and (4) heating the first colored coating film formed in step (1), the second colored coating film formed in step (2), and the clear coating film formed in step (3) simultaneously to cure the coating films, wherein a solid content of the aqueous second colored paint (Y) is in a range of 0.1 to 6 mass %, a dry film thickness of the second colored coating film is in a range of 0.2 to 3.0 μm, an average value of light transmittance of the second colored coating film at a wavelength of 400 nm or longer and 700 nm or shorter is 1% or lower, and a difference |R(X)−R(S)| between an average value (R(X)) of light reflectance (110°) of the first colored coating film at a wavelength of 400 nm or longer and 700 nm or shorter and an average value (R(S)) of light reflectance (110°) of the multilayer coating film at a wavelength of 400 nm or longer and 700 nm or shorter is 5% or lower.

Item 2. The multilayer coating film forming method according to item 1, wherein the effect pigment (x2) in the aqueous first colored paint (X) contains an aluminum pigment.

Item 3. The multilayer coating film forming method according to item 1 or 2, wherein the viscosity modifier (y1) is a cellulose nanofiber.

Item 4. The multilayer coating film forming method according to any one of items 1 to 3, wherein a content of the color pigment (y2) in the aqueous second colored paint (Y) is in a range of 0.1 to 5 parts by mass per 100 parts by mass of a total solid content of the aqueous second colored paint (Y).

Item 5. The multilayer coating film forming method according to any one of items 1 to 4, wherein the effect pigment (y3) in the aqueous second colored paint (Y) contains an aluminum pigment and/or a vapor-deposited metal flake pigment.

Advantageous Effects of Invention

According to the method of the present invention, a multilayer coating film having reduced nonuniformity and exhibiting excellent luster and high flip-flop properties can be formed.

BRIEF DESCRIPTION OF DRAWINGS

FIG. 1 is a diagram illustrating an overview of a method for measuring light reflectance.

DESCRIPTION OF EMBODIMENTS

A multilayer coating film forming method of the present invention is a multilayer coating film forming method characterized by including:

(1) applying an aqueous first colored paint (X) containing a color pigment (x1) and an effect pigment (x2) on an object to be coated to form a first colored coating film;

(2) applying an aqueous second colored paint (Y) containing a viscosity modifier (y1), a color pigment (y2), and an effect pigment (y3) on the first colored coating film to form a second colored coating film;

(3) applying a clear paint (Z) on the second colored coating film to form a clear coating film; and (4) heating the first colored coating film formed in step (1), the second colored coating film formed in step (2), and the clear coating film formed in step (3) simultaneously to cure the coating films, in which a solid content of the aqueous second colored paint (Y) is in a range of 0.1 to 6 mass %, a dry film thickness of the second colored coating film is in a range of 0.2 to 3.0 μm, an average value of light transmittance of the second colored coating film at a wavelength of 400 nm or longer and 700 nm or shorter is 1% or lower, and a difference |R(X)−R(S)| between an average value (R(X)) of light reflectance (110°)of the first colored coating film at a wavelength of 400 nm or longer and 700 nm or shorter and an average value (R(S)) of light reflectance (110°)of the multilayer coating film at a wavelength of 400 nm or longer and 700 nm or shorter is 5% or lower.

Step (1)

According to the multilayer coating film forming method of the present invention, first, the aqueous first colored paint (X) containing the color pigment (x1) and the effect pigment (x2) is applied on an object to be coated, and the first colored coating film is formed.

Object to be Coated

The object to be coated for applying the aqueous first colored paint (X) is not particularly limited. Examples of the object to be coated include outer panel parts of automobile bodies, such as those of passenger cars, trucks, motorcycles, and buses; automobile parts; outer panel parts of home electrical appliances, such as mobile phones and audio devices. Among these, outer panel parts of automobile bodies and automobile parts are preferred.

Materials of these objects to be coated are not particularly limited. Examples include metal materials, such as iron, aluminum, brass, copper, tin plates, stainless steel, galvanized steel, and zinc alloy (such as Zn—Al, Zn—Ni, and Zn—Fe)-plated steel; resins, such as polyethylene resins, polypropylene resins, acrylonitrile-butadiene-styrene (ABS) resins, polyamide resins, acrylic resins, vinylidene chloride resins, polycarbonate resins, polyurethane resins, and epoxy resins; plastic materials, such as various FRPs; inorganic materials, such as glass, cement, and concrete; woods; and fiber materials, such as paper and cloth. Among these, a metal material and a plastic material are preferred.

The object to be coated may be those subjected to surface treatment, such as phosphate salt treatment, chromate treatment, or composite oxide treatment, on metal surfaces of automobile body outer panel parts, automobile parts, home electrical appliances, metal substrates and the like of steel plates and the like constituting these.

A coating film may be further formed on an object that may or may not be surface-treated. For example, an object to be coated, which is a substrate, may be surface-treated as necessary, and an undercoating film may be formed on the treated surface, and an intermediate coating film may be formed on the undercoating film. For example, when the object to be coated is an automobile body, the undercoating film and the intermediate coating film can be formed using paints for undercoating and intermediate coating that are per se known and typically used in coating automobile bodies.

For example, an electrodeposition paint, preferably a cationic electrodeposition paint, can be used as the undercoating paint to form the undercoating film. In addition, a paint that can be used as the intermediate coating paint for forming the intermediate coating film includes a paint prepared using a base resin having a cross-linking functional group such as a carboxyl group or a hydroxyl group, such as an acrylic resin, a polyester resin, an alkyd resin, a urethane resin, or an epoxy resin; and a cross-linker, such as an amino resin such as a melamine resin or a urea resin, or a polyisocyanate compound that may be blocked; together with a pigment, a thickener, and an optional additional component.

In the present specification, the wording "an aqueous first colored paint (X) is applied to an object to be coated" is not limited to applying an aqueous first colored paint (X) directly on an object to be coated but also includes applying an additional layer, such as surface treatment, an undercoating film, and/or an intermediate coating film, on an object to be coated and then applying an aqueous first colored paint (X) on the additional layer.

Aqueous First Colored Paint (X)

The aqueous first colored paint (X) contains the color pigment (x1) and the effect pigment (x2).

In the present specification, the aqueous paint is a term used in contrast to an organic solvent-based paint and usually means a paint formed by dispersing and/or dissolving a coating film-forming resin, a pigment, and the like in water or a medium containing water as a main component (aqueous media). In addition, the organic solvent-based paint is a paint containing substantially no water as a solvent or containing only or almost only an organic solvent as a solvent.

Examples of the color pigment (x1) include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments. Among them, carbon black can be preferably used from the viewpoint of reducing nonuniformity of the multilayer coating film formed.

The content of the color pigment (x1) is in a range preferably of 0.01 to 80 parts by mass, more preferably of 0.1 to 65 parts by mass, and even more preferably of 0.2 to 50 parts by mass based on 100 parts by mass of resin solid content in the aqueous first colored paint (X) from the viewpoint of reducing nonuniformity of the multilayer coating film formed.

In addition, for the color pigment (x1) containing the carbon black, the content of the carbon black is in a range preferably of 0.01 to 40 parts by mass, more preferably of 0.1 to 20 parts by mass, and even more preferably of 0.2 to 10 parts by mass based on 100 parts by mass of resin solid content in the aqueous first colored paint (X) from the viewpoint of reducing nonuniformity of the multilayer coating film formed.

Examples of the effect pigment (x2) include aluminum pigments, vapor-deposited metal flake pigments, and light interference pigments. Among them, from the viewpoint of forming a multilayer coating film having reduced nonuniformity and exhibiting excellent metallic luster, an aluminum pigment is preferably used, and from the viewpoint of forming a multilayer coating film having reduced nonuniformity and exhibiting excellent pearly luster, a light interference pigment is preferably used. One type or two or more types of these pigments can be appropriately selected and used.

The aluminum pigment is usually produced by grinding or milling aluminum in a ball mill or an attritor mill using a grinding aid in the presence of a grinding liquid medium. Examples of the grinding aid used in the production process of the aluminum flake pigment include higher fatty acids, such as oleic acid, stearic acid, isostearic acid, lauric acid, palmitic acid, and myristic acid; as well as aliphatic amines, aliphatic amides, and aliphatic alcohols. Examples of the grinding liquid medium used include aliphatic-based hydrocarbons, such as mineral spirits.

In addition, examples of the aluminum pigment that may be used include colored aluminum pigments, such as those formed by coating the aluminum pigment surface with a color pigment and further coating with a resin; and those formed by coating the aluminum pigment surface with a metal oxide, such as an iron oxide.

The aluminum pigment with an average particle size in a range of 1 to 100 μm is preferably used, and the average particle size is more preferably in a range of 5 to 50 μm and particularly preferably in a range of 7 to 30 μm. The aluminum pigment with a thickness in a range of 0.01 to 2.0 μm is preferably used, and the thickness is particularly preferably in a range of 0.02 to 1.0 μm.

For the aqueous first colored paint (X) containing an aluminum pigment as the effect pigment (x2). the content of the aluminum pigment is preferably in a range of 0.1 to 50 parts by mass and more preferably in a range of 1 to 20 parts by mass based on 100 parts by mass of resin solid content in the aqueous first colored paint (X) from the viewpoint of forming a multilayer coating film exhibiting excellent metallic luster.

The vapor-deposited metal flake pigment is obtained by vapor depositing a metal film on a base substrate and peeling off the base substrate, and then grinding the vapor-deposited metal film. Examples of the base substrate include films.

The metal material is not particularly limited, but examples include aluminum, gold, silver, copper, brass, titanium, chromium, nickel, nickel-chromium, and stainless steel. Among them, aluminum or chromium is suitable from the viewpoints of availability and ease of handling in particular. In the present specification, a vapor-deposited metal flake pigment produced by vapor deposition of aluminum is referred to as an "vapor-deposited aluminum flake pigment", and a vapor-deposited metal flake pigment produced by vapor deposition of chromium is referred to as a "vapor-deposited chromium flake pigment".

In the present specification, the "vapor-deposited aluminum flake pigment" is included not in the aluminum pigment but in the vapor-deposited metal flake pigment.

A vapor-deposited metal flake pigment formed of one layer of a vapor-deposited metal film can be used as the vapor-deposited metal flake pigment, but a multilayer-type vapor-deposited metal flake pigment in which another metal and/or metal oxide is further formed on the vapor-deposited metal film may be used.

A surface of the vapor-deposited aluminum flake pigment is preferably treated with silica, from the viewpoints of providing storage stability and excellent metallic luster to the coating film.

Examples of commercially available products that can be used as the vapor-deposited aluminum flake pigment include "METALURE" series (trade name, available from ECKART GmbH), "Hydroshine WS" series (trade name, available from ECKART GmbH), "Decomet" series (trade name, available from Schlenk), and "Metasheen" series (trade name, available from BASF).

Examples of commercially available products that can be used as the vapor-deposited chromium flake pigment include "Metalure Liquid Black" series (trade name, available from ECKART GmbH).

An average thickness of the vapor-deposited metal flake pigment is preferably from 0.01 to 1.0 μm and more preferably from 0.015 to 0.1 μm.

An average particle size of the vapor-deposited metal flake pigment is preferably from 1 to 50 μm and more preferably from 5 to 20 μm.

For the aqueous first colored paint (X) containing a vapor-deposited metal flake pigment as the effect pigment (x2), the content of the vapor-deposited metal flake pigment is preferably in a range of 0.1 to 30 parts by mass and more preferably in a range of 1 to 20 parts by mass based on 100 parts by mass of resin solid content in the aqueous first colored paint (X) from the viewpoint of forming a multilayer coating film exhibiting excellent metallic luster.

Examples of the light interference pigment include effect pigments formed by coating a surface of a transparent or translucent flaky substrate, such as a substrate of natural mica, artificial mica, glass, silica, or a metal oxide of any of various types including an iron oxide and an aluminum oxide, with a metal oxide having a different refractive index from that of the substrate. The light interference pigments can be used alone or in combination of two or more.

The natural mica is a flaky substrate formed by grinding mineral mica. The artificial mica is synthesized by heating industrial materials, such as $SiO_2$, MgO, $Al_2O_3$, $K_2SiF_6$, and $Na_2SiF_6$, melting the materials at a high temperature of about 1500° C., and cooling the materials to undergo the crystallization. The artificial mica contains a smaller amount of impurities and is more uniform in size and thickness in comparison with the natural mica. Specific examples of the substrate of the artificial mica include fluorophlogopite ($KMg_3AlSi_3O_{10}F_2$), potassium tetrasilicic mica ($KMg_{2.5}AlSi_4O_{10}F_2$), sodium tetrasilicic mica ($NaMg_{2.5}AlSi_4O_{10}F_2$), Na-taeniolite ($NaMg_2LiSi_4O_{10}F_2$), and LiNa-taeniolite ($LiMg_2LiSi_4O_{10}F_2$).

Examples of the metal oxide used in coating of the substrate include titanium oxides and iron oxides, and the light interference pigment can exhibit different interference colors depending on different thickness of the metal oxide.

Specific examples of the light interference pigment include metal oxide-coated mica pigments, metal oxide-coated alumina flake pigments, metal oxide-coated glass flake pigments, and metal oxide-coated silica flake pigments shown below.

The metal oxide-coated mica pigment is a pigment produced by using natural mica or artificial mica as a substrate and coating the substrate surface with a metal oxide.

The metal oxide-coated alumina flake pigment is a pigment in which alumina flakes serve as substrates and a metal oxide is coated on the substrate surface. The alumina flakes mean flaky (thin flaky) aluminum oxide and are colorless and transparent. The alumina flakes need not consist of aluminum oxide alone and may contain an oxide of another metal.

The metal oxide-coated glass flake pigment is a pigment in which flake glass serves as a substrate and a metal oxide is coated on the substrate surface. The metal oxide-coated glass flake pigment has a smooth substrate surface and thus causes strong light reflection.

The metal oxide-coated silica flake pigment is a pigment in which flake silica, a substrate having a smooth surface and uniform thickness, is coated with a metal oxide.

For the aqueous first colored paint (X) containing a light interference pigment as the effect pigment (x2), the content of the light interference pigment is preferably in a range of 0.1 to 30 parts by mass and more preferably in a range of 0.1 to 20 parts by mass based on 100 parts by mass of resin solid content in the aqueous first colored paint (X) from the viewpoint of forming a multilayer coating film exhibiting excellent pearly luster.

In addition, a total content of the effect pigment (x2) is preferably in a range of 0.1 to 60 parts by mass and more preferably in a range of 1 to 25 parts by mass based on 100 parts by mass of resin solid content in the aqueous first colored paint (X) from the viewpoint of forming a multilayer coating film exhibiting excellent luster (e.g., metallic or pearly luster).

The aqueous first colored paint (X) can typically contain a resin component as a vehicle. A thermosetting resin composition is preferably used as the resin component, and specific examples include thermosetting resin compositions containing: a base resin having a cross-linking functional group such as a hydroxyl group, such as an acrylic resin, a polyester resin, an alkyd resin, or a urethane resin; and a cross-linker, such as a melamine resin, a urea resin, or a polyisocyanate compound (including a blocked polyisocyanate compound). These thermosetting resin compositions can be used by dissolving or dispersing in a solvent, such as an organic solvent and/or water. A ratio of the base resin and the cross-linker in the resin composition is not particularly limited, but the cross-linker can usually be used in a range of 10 to 100 mass %, preferably of 20 to 80 mass %, and more preferably of 30 to 60 mass % relative to the total amount of the base resin solid content.

The aqueous first colored paint (X) can be further blended as necessary with a paint additive of various types, such as a rheology control agent, a pigment dispersant, an anti-settling agent, a curing catalyst, a defoamer, an antioxidant, or an ultraviolet absorber; an organic solvent; or an extender pigment.

The aqueous first colored paint (X) can be applied by a method, such as electrostatic coating, air spraying, or airless spraying, and the film thickness of the first colored coating film is approximately from I to 40 μm, more preferably from 3 to 30 μm, and even more preferably approximately from 5 to 20 μm based on the cured coating film from the viewpoint of reducing nonuniformity of the multilayer coating film formed.

The solid content of the aqueous first colored paint (X) is in a range of 5 to 65 mass %, preferably of 10 to 55 mass %, and even more preferably of 15 to 50 mass %. In addition, the viscosity of the aqueous first colored paint (X) is preferably appropriately adjusted using water and/or an organic solvent to give a range suitable for coating, typically, a viscosity in a range of 500 to 8000 mPa·s when measured at 20° C. using a B-type viscometer at a rotational speed of 6 rpm.

The first colored coating film can be subjected to preheating, air blowing, or the like under heating conditions where the coating film does not substantially cure before coated with the aqueous second colored paint (Y) described later. The temperature of the preheating is preferably from 40 to 100° C., more preferably from 50 to 90° C., and even more preferably from 60 to 80° C. The time of the preheating is preferably from 30 seconds to 15 minutes, more preferably from 1 to 10 minutes, and even more preferably from 2 to 5 minutes. In addition, the air blowing can be performed. for example, by blowing air of normal temperature or heated to a temperature of 25° C. to 80° C. on the coated surface of the coated object for 30 seconds to 15 minutes.

The average value (R(X)) of light reflectance (110°) of the first colored coating film at a wavelength of 400 nm or longer and 700 nm or shorter is preferably in a range of 0.1 to 20%, more preferably in a range of 0.5 to 15%, and even more preferably in a range of 1 to 20% from the viewpoint of forming a multilayer coating film having reduced nonuniformity and exhibiting excellent luster (such as metallic or pearly luster).

Here, the average value (R(X)) of light reflectance (110°) of the first colored coating film at a wavelength of 400 nm or longer and 700 nm or shorter can be measured by the following method.

First, an object to be coated in which a gray-colored cured coating film with an L* value of 59 is formed is produced. The L* value of the cured coating film in the object to be coated represents lightness If in the L*C*h color system, when measured, using a multi-angle spectrophotometer "MA-6811" (trade name, available from X-Rite, Incorporated), by irradiating the surface to be measured with measuring light at an angle of 45° to the axis perpendicular to the surface to be measured and measuring light received at an angle of 45° from the specular reflection angle to the direction of the measuring light.

Here, the "L*C*h color system" is a polar coordinate expression of the L*a*b* color system defined by the International Commission on Illumination in 1976 and also employed in JIS Z 8781-4 (2013), where the L* value represents lightness, the C* value represents chroma as a distance from the origin, and the h value represents a hue angle shifted from the axis in the a* red direction in the L*a*b* color system, the axis being taken as 0°, to the hue in the counterclockwise direction.

The object to be coated can be produced, for example, as follows: a cationic electrodeposition paint "Electron GT-10" (trade name: available from Kansai Paint Co., Ltd., a paint in which a block polyisocyanate compound is used as a curing agent for an epoxy resin polyamine-based cation resin) is applied by electrodeposition on a degreased and zinc phosphate-treated steel sheet to give a film thickness of a cured coating film of 20 μm. The paint is cross-linked and cured by heating at 170° C. for 20 minutes, and an electrodeposition coating film is formed. Then, "TP-90 No. 8101 Gray" (trade name, available from Kansai Paint Co., Ltd., a hydroxyl group/melamine and a block polyisocyanate group-curable one-component type organic solvent-based paint) is applied on the electrodeposition coating surface of the resulting steel sheet by air spraying to give a film thickness of 40 μm based on a cured coating film, allowed to stand for 7 minutes, then heated at 140° C. for 30 minutes to form an intermediate coating film.

The aqueous first colored paint (X) is then applied on the object to be coated to give the same dry film thickness as the dry film thickness of the first colored coating film formed in step (1). The object to be coated is allowed to stand for 3 minutes and then preheated at 80° C. for 3 minutes to form an uncured first colored coating film. The clear paint (Z) is then applied on the uncured first colored coating film to give a dry coating film thickness of 35 μm, and a clear coating film is formed. The uncured first colored coating film and the clear coating film are then allowed to stand at room temperature for 7 minutes and then heated at 140° C. for 30 minutes to cure the first colored coating film and the clear coating film. Then, the average value (R(X)) of light reflectance (110°) of the first colored coating film at a wavelength of 400 nm or longer and 700 nm or shorter can be determined, using a multi-angle spectrophotometer, by irradiating the coating film surface with measuring light at an angle of 45° to the axis perpendicular to the coating film surface and measuring light reflectance at a wavelength range of 400 nm or longer and 700 nm or shorter for light received at an angle of 110° from the specular reflection angle to the direction of the measuring light, and calculating the average value. For the multi-angle spectrophotometer, for example, an "MA-6811" (trade name, available from X-Rite, Incorporated) or the like can be used.

Step (2)

According to the multilayer coating film forming method of the present invention, next, the aqueous second colored paint (Y) containing the viscosity modifier (y1), the color pigment (y2), and the effect pigment (y3) is applied on the first colored coating film obtained in step (1), and the second colored coating film is formed.

Aqueous Second Colored Paint (Y)

The aqueous second colored paint (Y) contains the viscosity modifier (y1), the color pigment (y2), and the effect pigment (y3).

A known viscosity modifier can be used as the viscosity modifier (y1); examples include silica-based fine powders, mineral-based viscosity modifiers, barium sulfate micronized powders, polyamide-based viscosity modifiers, organic resin particulate viscosity modifiers, diurea-based viscosity modifiers, urethane-associative viscosity modifiers, poly (acrylic acid)-based viscosity modifiers that are acrylic swelling-type, and cellulose-based viscosity modifiers. Among them, from the viewpoint of providing a multilayer coating film exhibiting excellent luster (such as metallic or pearly luster) and the like, at least one viscosity modifier selected from mineral-based viscosity modifiers, poly (acrylic acid)-based viscosity modifiers, and cellulose-based viscosity modifiers is preferably used, and in particular, a cellulose-based viscosity modifier is preferably used. These viscosity modifiers can be used alone or in appropriate combination of two or more.

Examples of the mineral-based viscosity modifier include a swellable layered silicate salt with its crystal structure having a 2:1-type structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluoromica, Li-type tetrasilicic fluoromica, Na salt-type fluorotaeniolite, and Li-type fluorotaeniolite; vermiculite; substituted products or derivatives of these; and mixtures of these.

Examples of the poly(acrylic acid)-based viscosity modifier include sodium polyacrylate and poly(acrylate-co-(meth)acrylate).

Examples of commercially available products of the poly (acrylic acid)-based viscosity modifier include "Primal ASE-60", "Primal TT615", and "Primal RM5" (trade names) available from Dow Chemical Company; and "SN Thickener 613", "SN Thickener 618", "SN Thickener 630", "SN Thickener 634", and "SN Thickener 636" (trade names) available from San Nopco Limited. Examples of the poly (acrylic acid)-based viscosity modifier that can be used include those with a solid content acid value in a range of 30 to 300 mg KOH/g and preferably 80 to 280 mg KOH/g.

Examples of the cellulose-based viscosity modifier include carboxymethyl cellulose, methyl cellulose, hydroxyethyl cellulose, hydroxyethyl methyl cellulose, hydroxypropyl methyl cellulose, nanocellulose crystal, and cellulose nanofibers. Among them, from the viewpoint of providing a multilayer coating film exhibiting excellent luster (such as metallic or pearly luster) and the like, a cellulose nanofiber and/or a cellulose nanocrystal are/is preferably used, and a cellulose nanofiber is more preferably used.

The cellulose nanofiber may be referred to as a cellulose nanofibril or a fibrillated cellulose. In addition, the cellulose nanocrystal may be referred to as a nanocellulose crystal.

From the viewpoint of providing a multilayer coating film exhibiting excellent luster (such as metallic or pearly luster) and the like, the cellulose nanofiber has a number average fiber diameter in a range preferably of 2 to 500 nm, more preferably of 2 to 250 nm, and even more preferably of 2 to 150 nm and a number average fiber length in a range preferably of 0.1 to 20 gm, more preferably of 0.1 to 15 μm, and even more preferably of 0.1 to 10 μm.

The number average fiber diameter and the number average fiber length are measured and calculated, for example, from an image of a casted sample captured by transmission electron microscopy (TEM), the casted sample being prepared by dispersing a sample of a cellulose nanofiber diluted with water and casting the dispersed sample on a hydrophilized carbon film-coated grid.

For the cellulose nanofiber, a cellulose nanofiber obtained by defibrating a cellulose raw material and stabilizing the defibrated cellulose in water can be used. Here, the cellulose raw material means a material mainly composed of cellulose in various forms; specific examples include pulp (herb-derived pulp, such as wood pulp, jute, Manila hemp, and kenaf); natural cellulose, such as cellulose produced by a microorganism; regenerated cellulose obtained by dissolving cellulose in a certain solvent, such as a copper ammonia solution or a morpholine derivative, and then spinning; and fine cellulose obtained by depolymerization of cellulose by subjecting the above cellulose raw material to hydrolysis, alkaline hydrolysis, enzymatic degradation, blasting treatment, or mechanical treatment (such as vibration ball milling).

In addition, for the cellulose nanofiber, an anionically modified cellulose nanofiber can be used. Examples of the anionically modified cellulose nanofiber include carboxylated cellulose nanofibers, carboxylmethylated cellulose nanofibers, sulfonic acid group-containing cellulose nanofibers, and phosphate group-containing cellulose nanofibers. The anionically modified cellulose nanofiber can be obtained, for example, by introducing a functional group, such as a carboxyl group or a carboxylmethyl group, into a cellulose raw material by a known method, washing the resulting modified cellulose, preparing a dispersion liquid of modified cellulose, and defibrating the dispersion liquid. The carboxylated cellulose is also referred to as oxidized cellulose.

The oxidized cellulose can be obtained, for example, by oxidizing the cellulose raw material in water using an oxidizing agent in the presence of a compound selected from the group consisting of an N-oxyl compound, bromide, and iodide or mixtures of these.

Examples of commercially available products of the cellulose nanofiber include Rheocrysta (trade name) available from DKS Co. Ltd. and AURO VISCO (trade name) available from Oji Holdings Corporation. In addition, examples of commercially available products of the cellulose nanocrystal include "Celluforce NCC" available from Celluforce Inc.

The content of the viscosity modifier (y1) of the aqueous second colored paint (Y) is preferably in a range of 2 to 60 parts by mass and more preferably in a range of 5 to 45 parts by mass based on 100 parts by mass of total solid content in the aqueous second colored paint (Y) from the viewpoint of providing a multilayer coating film exhibiting excellent luster (such as metallic or pearly luster) and the like.

Examples of the color pigment (y2) include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments. Among them, carbon black can be preferably used from the viewpoint of reducing nonuniformity of the multilayer coating film formed.

The content of the color pigment (y2) is preferably in a range of 0.1 to 5 parts by mass and more preferably in a range of 0.3 to 3 parts by mass based on 100 parts by mass of total solid content in the aqueous second colored paint (Y) from the viewpoint of forming a multilayer coating film having reduced nonuniformity and exhibiting excellent luster (such as metallic or pearly luster).

Examples of the effect pigment (x3) include aluminum pigments, vapor-deposited metal flake pigments, and light interference pigments. Among them, from the viewpoint of forming a multilayer coating film having reduced nonuniformity and exhibiting excellent metallic luster, an aluminum pigment and/or a vapor-deposited metal flake pigment are/is preferably used, and from the viewpoint of forming a multilayer coating film having reduced nonuniformity and exhibiting excellent pearly luster, a light interference pigment is preferably used. One type or two or more types of these pigments can be appropriately selected and used.

Examples of the aluminum pigment include aluminum pigments described in the description section of the aqueous first colored paint (X).

For the aqueous second colored paint (Y) containing the aluminum pigment, the content of the aluminum pigment is preferably in a range of 10 to 85 parts by mass and more preferably in a range of 20 to 80 parts by mass based on 100 parts by mass of total solid content in the aqueous second colored paint (Y) from the viewpoint of providing a multilayer coating film exhibiting excellent metallic luster and the like.

Examples of the vapor-deposited metal flake pigment include vapor-deposited metal flake pigments described in the description section of the aqueous first colored paint (X). Among them, a vapor-deposited aluminum flake pigment is preferably used from the viewpoint of providing a multilayer coating film exhibiting excellent metallic luster and the like.

For the aqueous second colored paint (Y) containing the vapor-deposited metal flake pigment, the content of the vapor-deposited metal flake pigment is preferably in a range of 10 to 50 parts by mass and more preferably in a range of 15 to 45 parts by mass based on 100 parts by mass of total solid content in the aqueous second colored paint (Y) from the viewpoint of providing a multilayer coating film exhibiting excellent metallic luster and the like.

In addition, the aluminum pigment and the vapor-deposited metal flake pigment can be used in combination.

In the combined use of the aluminum pigment and the vapor-deposited metal flake pigment, the vapor-deposited metal flake pigment is preferably a vapor-deposited aluminum flake pigment from the viewpoint of providing a multilayer coating film exhibiting excellent metallic luster.

In the combined use of the aluminum pigment and the vapor-deposited metal flake pigment, the total content of the aluminum pigment and the vapor-deposited metal flake pigment is preferably in a range of 10 to 85 parts by mass and more preferably in a range of 15 to 50 parts by mass based on 100 parts by mass of total solid content in the aqueous second colored paint (Y) from the viewpoint of providing a multilayer coating film exhibiting excellent metallic luster and the like.

In the combined use of the aluminum pigment and the vapor-deposited metal flake pigment, the content ratio of the aluminum pigment and the vapor-deposited metal flake pigment in a mass ratio of the aluminum pigment/the vapor-deposited metal flake pigment is preferably from 10/90 to 50/50 and more preferably from 20/80 to 40/60 from the viewpoint of providing a multilayer coating film exhibiting excellent metallic luster and the like.

Examples of the light interference pigment include light interference pigments described in the description section of the aqueous first colored paint (X).

For the aqueous second colored paint (Y) containing the light interference pigment, the content of the light interference pigment is preferably in a range of 10 to 80 parts by mass and more preferably in a range of 15 to 70 parts by mass based on 100 parts by mass of total solid content in the aqueous second colored paint (Y) from the viewpoint of providing a multilayer coating film exhibiting excellent pearly luster and the like.

The total content of the effect pigment (y3) in the aqueous second colored paint (Y) is preferably in a range of 5 to 90 parts by mass and more preferably in a range of 15 to 80 parts by mass based on 100 parts by mass of total solid content in the aqueous second colored paint (Y) from the viewpoint of providing a multilayer coating film exhibiting excellent luster (such as metallic or pearly luster) and the like.

In addition, the total content of the color pigment (y2) and the effect pigment (y3) in the aqueous second colored paint (Y) is preferably in a range of 5 to 95 parts by mass and more preferably in a range of 15 to 80 parts by mass based on 100 parts by mass of total solid content of the aqueous second colored paint (Y) from the viewpoint of forming a multilayer coating film having reduced nonuniformity and exhibiting excellent luster (such as metallic or pearly luster).

The aqueous second colored paint (Y) preferably further contains a wetting agent from the viewpoint of forming a multilayer coating film having reduced nonuniformity and exhibiting excellent luster (such as metallic or pearly luster). For the wetting agent, any material that is effective in helping the aqueous second colored paint (Y) be consistently oriented on the first colored coating film when the aqueous second colored paint (Y) is applied on the first colored coating film can be used without any particular limitation.

The material having such an effect may be referred to as a moistening agent, a leveling agent, a surface conditioner, a defoamer, a surfactant, a superwetter, or the like in addition to the wetting agent, and the wetting agent also includes a moistening agent, a leveling agent, a surface modifier, a defoamer, a surfactant, and a superwetter.

Examples of the wetting agent include silicone-based, acrylic-based, vinyl-based, fluorine-based, and acetylene diol-based wetting agents. The above wetting agents can be used alone or in appropriate combination of two or more.

For the wetting agent, an acetylene diol-based wetting agent and/or a wetting agent having an ethylene oxide chain are/is preferably used from the viewpoint of forming a multilayer coating film having reduced nonuniformity and exhibiting excellent luster (such as metallic or pearly luster).

In particular, for the wetting agent, a wetting agent that is an ethylene oxide adduct of acetylene diol is preferably used.

Examples of commercially available products of the wetting agent include Dynol series, Surfynol series, and Tego series available from Evonik Industries AG; BYK series available from BYK; Glanol series and Polyflow series available from Kyoeisha Chemical Co., Ltd.; and Disparlon series available from Kusumoto Chemicals, Ltd.

For the aqueous second colored paint (Y) containing the wetting agent, the content of the wetting agent is preferably in a range of 2 to 30 parts by mass and more preferably in a range of 3 to 20 parts by mass based on 100 parts by mass of total solid content in the aqueous second colored paint (Y) from the viewpoint of forming a multilayer coating film having reduced nonuniformity and exhibiting excellent luster (such as metallic or pearly luster).

The aqueous second colored paint (Y) preferably further contains an aqueous resin dispersion from the viewpoint of water resistance of the resulting multilayer coating film and the like.

The aqueous resin dispersion is a dispersion in which a resin is dispersed in an aqueous solvent and can contain, for example, at least one selected from the group consisting of aqueous urethane resin dispersions, aqueous acrylic resin dispersions, aqueous polyester resin dispersions, aqueous olefin resin dispersions, and composites of these resins. The aqueous dispersion may be modified.

Among these, from the viewpoint of water resistance of the resulting multilayer coating film, an aqueous urethane resin dispersion and/or an aqueous acrylic resin dispersion are/is preferred, and furthermore, an aqueous hydroxyl group-containing urethane resin dispersion and an aqueous hydroxyl group-containing acrylic resin dispersion are preferred. In particular, the aqueous hydroxyl group-containing acrylic resin dispersion is preferably a core-shell type.

For the aqueous second colored paint (Y) containing the aqueous resin dispersion, the content of the aqueous resin dispersion is preferably in a range of 1 to 60 parts by mass and more preferably in a range of 5 to 40 parts by mass based on 100 parts by mass of total solid content in the aqueous second colored paint (Y).

The aqueous second colored paint (Y) may be further appropriately blended as necessary with an organic solvent, a binder resin other than the aqueous resin dispersion, a cross-linking component, an extender pigment, a pigment dispersant, an anti-settling agent, an ultraviolet absorber, a light stabilizer, and the like.

The cross-linking component is a component for cross-linking and curing the aqueous resin dispersion by heating when the effect pigment dispersion contains the aqueous resin dispersion. When the effect pigment dispersion does not contain the aqueous resin dispersion, the cross-linking component may be a self-cross-linking component or may be a component for cross-linking and curing a portion of the aqueous first colored paint (X) for forming the first colored coating film, and/or a portion of a clear paint for forming a clear coating film described later. Examples of the cross-linking component include amino resins, urea resins. polyisocyanate compounds, blocked polyisocyanate compounds, carbodiimide group-containing compounds, hydrazide group-containing compounds, semicarbazide group-containing compounds, and silane coupling agents. Among these, the cross-linking component is preferably an amino resin, a polyisocyanate compound and a blocked polyisocyanate compound that are reactive with a hydroxyl group, or a carbodiimide group-containing compound that is reactive with a carboxyl group. Examples of the polyisocyanate compound and the blocked polyisocyanate compound that can be used include those described in the section on a clear paint described later. The cross-linking components can be used alone or in combination of two or more.

For the aqueous second colored paint (Y) containing the cross-linking component, the content of the cross-linking component is preferably in a range of 1 to 100 parts by mass, more preferably in a range of 5 to 95 parts by mass, and even more preferably in a range of 10 to 90 parts by mass in terms of solid content based on 100 parts by mass of the content of the effect pigment (y3) in the aqueous second colored paint (Y) from the viewpoint of water resistance of the resulting coating film and the like.

For the aqueous second colored paint (Y) containing the binder resin and/or the cross-linking component, the total content of the binder resin and the cross-linking component is preferably in a range of 0.1 to 500 parts by mass, more preferably in a range of 1 to 300 parts by mass, and even more preferably in a range of 10 to 100 parts by mass in terms of solid content based on 100 parts by mass of the solid content of the effect pigment (y3) in the aqueous second colored paint (Y) from the viewpoints of water-resistant adhesion of the resulting coating film and providing a multilayer coating film exhibiting excellent luster (such as metallic or pearly luster).

The aqueous second colored paint (Y) can be applied according to a typical method, for example, air spray coating, airless spray coating, or rotary atomization coating. When the aqueous second colored paint (Y) is applied, an electrostatic voltage may be applied as necessary, and among others, electrostatic coating by rotary atomization and electrostatic coating by air spraying are preferred, and electrostatic coating by rotary atomization is particularly preferred.

In addition, when the aqueous second colored paint (Y) is applied by air spray coating, airless spray coating, or rotary atomization coating, the aqueous second colored paint (Y) preferably appropriately contains water and/or an organic solvent as well as an additive, such as a defoamer, as necessary to adjust the solid content and viscosity to be suitable for coating.

The solid content of the aqueous second colored paint (Y) is in a range of 0.1 to 6 mass %.

With the solid content of the aqueous second colored paint (Y) in the above range, a multilayer coating film having reduced nonuniformity and exhibiting excellent luster (such as metallic or pearly luster) can be formed. In particular, the solid content of the aqueous second colored paint (Y) is preferably in a range of 0.3 to 5.5 mass % and more preferably in a range of 0.5 to 5.0 mass % from the viewpoint of forming a multilayer coating film having reduced nonuniformity and exhibiting excellent luster (such as metallic or pearly luster). In a typical embodiment of the present invention, the solid content of 0.1 to 6 mass % is intended to be 0.1 to 6.0 mass %. In addition, in a typical embodiment of the present invention, the solid content of 0.5 to 6 mass % is intended to be 0.5 to 5.0 mass %.

Furthermore, the aqueous second colored paint (Y) preferably contains a large amount of water. The content of water in the aqueous second colored paint (Y) is preferably in a range of 65 to 95 parts by mass and more preferably in a range of 75 to 90 parts by mass per 100 parts by mass of a total of all components of the effect pigment dispersion from the viewpoint of providing a coating film with excellent metallic or pearly luster.

The viscosity of the aqueous second colored paint (Y) one minute after measurement at a temperature of 20° C. using a B-type viscometer at 6 rpm (which may be referred to as a "B6 value" in the present specification) is preferably from 100 to 10000 mPa·s and more preferably from 300 to 6000 mPa·s from the viewpoint of providing a multilayer coating film exhibiting excellent luster (such as metallic or pearly luster) and the like. The viscometer used here is a digital Vismetron viscometer VDA type (B-type viscometer available from Shibaura Systems Co., Ltd.).

The second colored coating film can be subjected to preheating, air blowing, or the like under heating conditions where the coating film does not substantially cure before coated with the clear paint (Z) described later. The temperature of the preheating is preferably from 40 to 100° C., more preferably from 50 to 90° C., and even more preferably from 60 to 80° C. The time of the preheating is preferably from 30 seconds to 15 minutes, more preferably from 1 to 10 minutes, and even more preferably from 2 to 5 minutes. In addition, the air blowing can be performed, for example, by blowing air of normal temperature or heated to a temperature of 25° C. to 80° C. on the coated surface of the coated object for 30 seconds to 15 minutes.

The dry film thickness of the second colored coating film is in a range of 0.2 to 3.0 μm. In the present invention, the dry film thickness of the coating film can be calculated using the following equation.

$$x=sc/sg/S*10000$$

x: Dry film thickness [μm]

sc: Coating solid content [g]

sg: Specific gravity of coating film [g/cm$^3$]

S: Evaluated surface area [cm$^2$] of the coating solid content

With the dry film thickness of the second colored coating film in the above range, a multilayer coating film having reduced nonuniformity and exhibiting excellent luster (such as metallic or pearly luster) can be formed. In particular, the dry film thickness of the second colored coating film is preferably in a range of 0.3 to 2.5 μm and more preferably in a range of 0.5 to 2.0 μm from the viewpoint of forming a multilayer coating film having reduced nonuniformity and exhibiting excellent luster (such as metallic or pearly luster).

In addition, the average value of the light transmittance of the second colored coating film at a wavelength of 400 nm or longer and 700 nm or shorter is 1% or lower. In a typical embodiment of the present invention, the average value of the light transmittance of 1% or lower at a wavelength of 400 nm or longer and 700 nm or shorter is intended that the average value is 1.0% or lower.

With the average value of the light transmittance of the second colored coating film at a wavelength of 400 nm or longer and 700 nm or shorter in the above range, a multilayer coating film having reduced nonuniformity and exhibiting excellent luster (such as metallic or pearly luster) can be formed. In particular, the light transmittance is preferably in a range of 0.005 to 0.7%, more preferably in a range of 0.01 to 0.5%, and even more preferably in a range of 0.02 to 0.4% from the viewpoint of forming a multilayer coating film having reduced nonuniformity and exhibiting excellent luster (such as metallic or pearly luster).

Here, the average value of the light transmittance of the second colored coating film at a wavelength of 400 nm or longer and 700 nm or shorter can be measured by the following method.

First, the aqueous second colored paint (Y) is applied on an OHP sheet and cured. The light transmittance in a wavelength range of 400 nm or longer and 700 nm or shorter is then measured using a spectrophotometer, and an average value is calculated. For the spectrophotometer, for example, a "UV-2700" (trade name, available from Shimadzu Corporation) or the like can be used.

Step (3)

According to the multilayer coating film forming method of the present invention, next, the clear paint (Z) is applied on the second colored coating film obtained in step (2), and the clear coating film is formed.

Clear Paint (Z)

Examples of the clear paint (Z) that can be used include any of known thermosetting clear coating compositions. Examples of the thermosetting clear coating composition include: organic solvent-type thermosetting coating compositions containing a base resin having a cross-linking functional group and a curing agent; aqueous thermosetting coating compositions; and powder thermosetting coating compositions.

Examples of the cross-linking functional group contained in the base resin include a carboxyl group, a hydroxyl group, an epoxy group, and a silanol group. Examples of the type of base resin include acrylic resins, polyester resins, alkyd resins, urethane resins, epoxy resins, and fluororesins. Examples of the curing agent include polyisocyanate compounds, blocked polyisocyanate compounds, melamine resins, carboxyl group-containing resins, and epoxy group-containing resins.

The combination of the base resin/curing agent of the clear paint (Z) is preferably a carboxyl group-containing resin/epoxy group-containing resin, a hydroxyl group-containing resin/polyisocyanate compound, a hydroxyl group-containing resin/blocked polyisocyanate compound, a hydroxyl group-containing resin/melamine resin, or the like.

In addition, the clear paint (Z) may be a one-component paint or a multi-component paint, such as a two-component paint.

Among these, the clear paint (Z) is preferably a two-component clear paint containing a hydroxyl group-containing resin and a polyisocyanate compound described below from the viewpoint of adherence of the resulting coating film.

Hydroxyl Group-Containing Resin

Examples of the hydroxyl group-containing resin that can be used without limitation include any resin containing a hydroxyl group known in the art. Examples of the hydroxyl group-containing resin include hydroxyl group-containing acrylic resins, hydroxyl group-containing polyester resins, hydroxyl group-containing polyether resins, and hydroxyl group-containing polyurethane resins, preferred examples include hydroxyl group-containing acrylic resins and hydroxyl group-containing polyester resins, and particularly preferred examples include hydroxyl group-containing acrylic resins.

The hydroxyl value of the hydroxyl group-containing acrylic resin is preferably in a range of 80 to 200 mg KOH/g and more preferably in a range of 100 to 180 mg KOH/g from the viewpoints of scratch resistance and water resistance of the coating film.

The weight average molecular weight of the hydroxyl group-containing acrylic resin is preferably in a range of 2500 to 40000 and more preferably in a range of 5000 to 30000 from the viewpoints of acid resistance and smoothness of the coating film.

In the present specification, the weight average molecular weight is a value calculated from a chromatogram measured by a gel permeation chromatograph calibrated with the molecular weight of standard polystyrene. For the gel permeation chromatograph, "HLC8120 GPC" (available from Tosoh Corporation) is used. The gel permeation chromatography is performed using four columns "TSKgel G-4000HXL", "TSKgel G-3000HXL", "TSKgel G-2500HXL", and "TSKgel G-2000HXL" (trade names, all available from Tosoh Corporation) under conditions of a mobile phase of tetrahydrofuran, a measurement temperature of 40° C., a flow rate of 1 cc/min, and a detector of RI.

A glass transition temperature of the hydroxyl group-containing acrylic resin is preferably from −40° C. to 20° C. and particularly preferably in a range of −30° C. to 10° C. The hydroxyl group-containing acrylic resin having a glass transition temperature of −40° C. or higher provides the coating film with sufficient hardness, and the hydroxyl group-containing acrylic resin having a glass transition temperature of 20° C. or lower can maintain the coated surface smoothness of the coating film.

Polyisocyanate Compound

The polyisocyanate compound is a compound having at least two isocyanate groups per molecule, and examples include aliphatic polyisocyanates, alicyclic polyisocyanates, aromatic-aliphatic polyisocyanates, aromatic polyisocyanates, and derivatives of the polyisocyanates.

Examples of the aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or its mixture, methylenebis(4,1-cyclohexanediyl) diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include aromatic-aliphatic diisocyanates, such as methylenebis(4,1-phenylene) diisocyanate (common name: MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (common name: tetramethylxylylene diisocyanate) or its mixture; and aromatic-aliphatic triisocyanates, such as 1,3,5-triisocyanatomethylbenzene.

Examples of the aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

In addition, examples of the derivatives of the polyisocyanates include dimers, trimers, biuret, allophanate, uretdione, uretoimine, isocyanurates, oxadiazinetrione, and polymethylene polyphenyl polyisocyanates (crude MDI and polymeric MDI), and crude TDI of the polyisocyanates described above. The derivatives of the polyisocyanates may be used alone or in combination of two or more.

The polyisocyanates and their derivatives may each be used alone or in combination of two or more.

Examples that can be suitably used include hexamethylene diisocyanate-based compounds among the aliphatic diisocyanates and 4,4'-methylenebis(cyclohexyl isocyanate) among the alicyclic diisocyanates. Among these, a derivative of hexamethylene diisocyanate is optimal from the viewpoint of adherence and compatibility.

In addition, examples of the polyisocyanate compound that may be used include prepolymers formed by reacting the polyisocyanate or its derivative described above with a compound having an active hydrogen group, such as a hydroxyl group or an amino group, which can react with the polyisocyanate, under conditions of excess isocyanate groups. Examples of the compound that can react with the polyisocyanate include polyhydric alcohols, low molecular weight polyester resins, amines, and water.

In addition, examples of the polyisocyanate compound also include blocked polyisocyanate compounds, which are compounds formed by blocking an isocyanate group in the polyisocyanate and its derivative with a blocking agent.

Examples of the blocking agent include phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When the polyisocyanate compound is blocked (the polyisocyanate compound is reacted with a blocking agent), a solvent can be added as necessary to perform blocking. The solvent used in the blocking reaction is preferably a solvent not reactive with an isocyanate group, and examples include ketones, such as acetone and methyl ethyl ketone; esters, such as ethyl acetate; and a solvent such as N-methyl-2-pyrrolidone (NMP).

The polyisocyanate compounds can be used alone or in combination of two or more.

The polyisocyanate compounds can be used alone or in combination of two or more. In an embodiment of the present invention, from the viewpoint of curability and scratch resistance of the coating film, an equivalent ratio of hydroxyl groups of the hydroxyl group-containing resin to isocyanate groups of the polyisocyanate compound (OH/NCO) is preferably in a range of 0.5 to 2.0 and more preferably 0.8 to 1.5.

When a two-component clear paint containing a hydroxyl group-containing resin and a polyisocyanate compound is used as the clear paint (Z), the hydroxyl group-containing resin and the polyisocyanate compound are preferably separated from each other from the viewpoint of storage stability, and these two parts are mixed and adjusted immediately before use.

One-component paint may be used as the clear paint (Z). Examples of the combination of the base resin/curing agent in the one-component paint include a carboxyl group-containing resin/epoxy group-containing resin, a hydroxyl group-containing resin/blocked polyisocyanate compound, and a hydroxyl group-containing resin/melamine resin.

The clear paint (Z) can further contain as necessary a solvent, such as water or an organic solvent; or an additive, such as a curing catalyst, a defoamer, or an ultraviolet absorber.

The clear paint (Z) can be appropriately blended with a color pigment in a range that does not impair the transparency. Examples of the color pigment that can be blended include one type or a combination of two or more types of pigments known in the art as a pigment for ink or paint. An amount of the color pigment added may be appropriately determined but is 30 parts by mass or less and preferably from 0.01 to 10 parts by mass per 100 parts by mass of a vehicle-forming resin composition in the clear paint.

A form of the clear paint (Z) is not particularly limited, but the clear paint (Z) is typically used in the form of an organic solvent type coating composition. Examples of the organic solvent used in this case include various organic solvents for coatings, such as aromatic or aliphatic hydrocarbon-based solvents, ester-based solvents, ketone-based solvents, and ether-based solvents. For an organic solvent used, the organic solvent used for preparing a hydroxyl group-containing resin or the like may be used as is or may be further added as appropriate.

A solid concentration of the clear paint (Z) is preferably approximately from 30 to 70 mass % and more preferably in a range of approximately 40 to 60 mass %.

The clear paint (Z) can be applied without any particular limitation; for example, it can be applied by a coating method, for example, air spraying, airless spraying, rotary atomization coating, or curtain coating. In these coating methods, an electrostatic voltage may be applied as necessary. Among these, rotary atomization coating by electrostatic application is preferred. An applied amount of the clear paint (Z) is typically an amount resulting in a cured film thickness of preferably approximately 10 to 50 μm.

In addition, when the clear paint (Z) is applied, the viscosity of the clear paint (Z) is preferably adjusted appropriately using a solvent, such as an organic solvent, to a viscosity range suitable for the coating method. For example, in rotary atomization coating by electrostatic application, the viscosity is preferably adjusted to a range of approximately 15 to 60 seconds as measured with a Ford Cup No. 4 viscometer at 20° C.

Step (4)

According to the multilayer coating film forming method of the present invention, the first colored coating film formed in step (1), the second colored coating film formed in step (2), and the clear coating film formed in step (3) are then simultaneously heated, and the multilayer coating films are simultaneously cured accordingly.

The heating means can be performed, for example, by hot air heating, infrared heating, high-frequency heating, or the like. The heating temperature is preferably from 80 to 160° C. and more preferably from 100 to 140° C. In addition, the heating time is preferably from 10 to 60 minutes and more preferably from 15 to 40 minutes. Before performing the above heating and curing, heating may be performed as necessary directly or indirectly by preheating, air blowing, or the like at a temperature of about 50 to about 110° C. and preferably of about 60 to about 90° C. approximately for 1 to 60 minutes.

Multi Layer Coating Film

The average value (R(S)) of light reflectance (110°) of the multilayer coating film formed by the multilayer coating film forming method of the present invention at a wavelength of 400 nm or longer and 700 nm or shorter is preferably in a range of 0.1 to 10%, more preferably in a range of 0.5 to 7%, and even more preferably in a range of 1 to 5% from the viewpoint of forming a multilayer coating film having reduced nonuniformity and exhibiting excellent luster (such as metallic or pearly luster).

Here, the average value (R(S)) of light reflectance (110°) of the multilayer coating film at a wavelength of 400 nm or longer and 700 nm or shorter can be obtained, using a multi-angle spectrophotometer, by applying measuring light on the multilayer coating film at an angle of 45° to the axis perpendicular to the surface to be measured and measuring light reflectance at a wavelength range of 400 nm or longer and 700 nm or shorter for light received at an angle of 110° from the specular reflection angle to the direction of the measuring light, and calculating the average value (FIG. 1). For the multi-angle spectrophotometer, for example, an "MA-6811" (trade name, available from X-Rite, Incorporated) or the like can be used.

A difference |R(X)−R(S)| between the average value (R(X)) of light reflectance (110°) of the first colored coating film at a wavelength of 400 nm or longer and 700 nm or shorter and the average value (R(S)) of light reflectance (110°) of the multilayer coating film at a wavelength of 400 nm or longer and 700 nm or shorter is 5% or lower. In a typical embodiment of the present invention, |R(X)−R(S)| of 5% or lower is intended that the value is 5.0% or lower. With the difference |R(X)−R(S)| between the average value (R(X)) of light reflectance (110°) of the first colored coating film at a wavelength of 400 nm or longer and 700 nm or shorter and the average value (R(S)) of light reflectance (110°) of the multilayer coating film at a wavelength of 400 nm or longer and 700 nm or shorter of 5% or lower, a multilayer coating film having reduced nonuniformity and exhibiting excellent luster (such as metallic or pearly luster) can be formed. In particular, from the viewpoint of forming a multilayer coating film having reduced nonuniformity and exhibiting excellent luster (such as metallic or pearly luster), the difference |R(X)−R(S)| between the average value (R(X)) of light reflectance (110°) of the first colored coating film at a wavelength of 400 nm or longer and 700 nm or shorter and the average value (R(S)) of light reflectance (110°) of the multilayer coating film at a wavelength of 400 nm or longer and 700 nm or shorter is preferably 4.7% or lower and more preferably 4.5% or lower.

EXAMPLES

The present invention will be described more specifically below with reference to production examples, examples, and comparative examples. These production examples, examples, and comparative examples are merely exemplary and are not intended to limit the scope of the present invention. In the production examples, examples, and comparative examples, "parts" and "%" are in mass basis unless otherwise specified. In addition, the film thickness of the coating film is based on a cured coating film.

[1] Production of Object to be Coated

A cationic electrodeposition paint "Electron GT-10" (trade name: available from Kansai Paint Co., Ltd., a paint in which a block polyisocyanate compound is used as a curing agent in an epoxy resin polyamine-based cation resin) was applied by electrodeposition on a degreased and zinc phosphate-treated steel sheet (JIS G 3141, a size of 400 mm×300 mm×0.8 mm) to give a film thickness of a cured coating film of 20 μm. The paint was cross-linked and cured by heating at 170° C. for 20 minutes, and an electrodeposition coating film was formed.

"TP-90 No. 8101 Gray" (trade name, available from Kansai Paint Co., Ltd., a hydroxyl group/melamine and a block polyisocyanate group-curable one-component type organic solvent-based paint) was applied on the electrodeposition coating surface of the resulting steel sheet by air spraying to give a film thickness of a cured coating film of 40 μm, allowed to stand for seven minutes, then heated at 140° C. for 30 minutes to form an intermediate coating film, and an object to be coated was produced. The L* value of the object to be coated was 59. The L* value of the object to be coated is lightness L* in the L*C*h color system, the lightness L* being measured, using a multi-angle spectrophotometer "MA-6811" (trade name, available from X-Rite, Incorporated), by irradiating the coating surface with measuring light at an angle of 45° to the axis perpendicular to the coating surface and measure light received at an angle of 45° from the specular reflection angle to the direction of the measuring light.

[2] Production of Paint

Production of Aqueous Acrylic Resin Dispersion (R-1)

Production Example 1

To a reaction vessel equipped with a thermometer, a thermostat, a stirring device, a reflux condenser, and a dripping device were placed 70.7 parts of deionized water and 0.52 parts of "AQUALON KH-10" (trade name, available from DKS Co. Ltd., an emulsifier, active ingredient 97%) and mixed by stirring in a nitrogen stream, and the temperature was raised to 80° C. Then, 1% of a total amount of a monomer emulsion described below and 5 parts of a 6% ammonium persulfate aqueous solution were introduced into the reaction vessel, and the reaction vessel was maintained at 80° C. for 15 minutes. The remaining monomer emulsion was then added dropwise over 3 hours into the reaction vessel maintained at the same temperature. After completion of the dropwise addition, the mixture was aged for 1 hour, then while 40 parts of a 5% 2-(dimethylamino)ethanol aqueous solution was gradually added to the reaction vessel, the mixture was cooled to 30° C. The mixture was discharged while the mixture was filtered with a 100-mesh nylon cloth, and an aqueous acrylic resin dispersion (R-1) with a solid concentration of 45% was obtained. The resulting aqueous acrylic resin dispersion (R-1) had a hydroxyl value of 43 mg KOH/g and an acid value of 12 mg KOH/g.

Monomer emulsion: A monomer emulsion was obtained by mixing and stirring 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 parts of "AQUALON KH-10", and 0.03 parts of ammonium persulfate.

Production of Hydroxyl Group-Containing Polyester Resin Solution (R-2)

Production Example 2

To a reaction vessel equipped with a thermometer, a thermostat, a stirring device, a reflux condenser, and a water separator, 174 parts of trimethylolpropane, 327 parts of neopentyl glycol, 352 parts of adipic acid, 109 parts of isophthalic acid, and 101 parts of 1,2-cyclohexanedicarboxylic anhydride were charged, and the temperature was raised from 160° C. to 230° C. over 3 hours. Then, while produced condensed water was distilled off with the water separator, the temperature was maintained at 230° C., and the mixture was reacted until the acid value reached 3 mg KOH/g or less. To this reaction product, 59 parts of trimellitic anhydride was added, and addition reaction was performed at 170° C. for 30 minutes. Then, the mixture was cooled to 50° C. or lower, and 2-(dimethylamino)ethanol was added in an amount equivalent to the acid groups to neutralize the mixture. Then, deionized water was gradually added, and a hydroxyl group-containing polyester resin solution (R-2) with a solid concentration of 45% was obtained. The resulting hydroxyl group-containing polyester resin solution (R-2) had a hydroxyl value of 128 mg KOH/g, an acid value of 35 mg KOH/g, and a weight average molecular weight of 13000.

Production of Phosphate Group-Containing Resin Solution (R-3)

Production Example 3

To a reaction vessel equipped with a thermometer, a thermostat, a stirrer, a reflux condenser, and a dripping device was placed a mixed solvent of 27.5 parts of methoxypropanol and 27.5 parts of isobutanol and heated to 110° C. To the mixed solvent was added over 4 hours 121.5 parts of a mixture composed of 25 parts of styrene, 27.5 parts of n-butyl methacrylate, 20 parts of "isostearyl acrylate" (trade name, Osaka Organic Chemical Industry Ltd., a branched higher alkyl acrylate), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of t-butyl peroxyoctanoate, and further added dropwise over one hour a mixture composed of 0.5 parts of t-butyl peroxyoctanoate and 20 parts of isopropanol. The mixture was then aged under stirring for one hour, and a phosphate group-containing resin solution (R-3) with a solid concentration of 50% was obtained. The acid value due to the phosphate group of this resin was 83 mg KOH/g, the hydroxyl value was 29 mg KOH/g, and the weight average molecular weight was 10000.

A phosphate-containing polymerizable monomer: To a reaction vessel equipped with a thermometer, a thermostat, a stirrer, a reflux condenser, and a dripping device were placed 57.5 parts of monobutyl phosphate and 41 parts of isobutanol, and the temperature was raised to 90° C. Then, 42.5 parts of glycidyl methacrylate was added dropwise over 2 hours, and then the mixture was aged by stirring for another one hour. Then, 59 parts of isopropanol was added, and a phosphate group-containing polymerizable monomer solution with a solid concentration of 50% was obtained. The acid value due to the phosphate group of the resulting monomer was 285 mg KOH/g.

Productions of Color Pigment Dispersion Liquids (P-1) to (P-3)

Production Example 4

56 parts (a solid content of 25 parts) of the hydroxyl group-containing polyester resin solution (R-2) obtained in Production Example 2, 0.2 parts of "RAVEN 5000 ULTRA III BEADS" (trade name, a carbon black pigment, available from COLUMBIAN CARBON CO.), and 5 parts of deionized water were mixed and adjusted to pH 8.0 with 2-(dimethylamino)ethanol. The resulting mixed solution was then placed in a wide-mouth glass bottle, glass beads with a diameter of about 1.3 mmφ were added as a dispersion media, and the wide-mouth glass bottle was sealed. The content was dispersed with a paint shaker for 30 minutes, and a color pigment dispersion liquid (P-1) was obtained.

Production Examples 5 to 6

Each of color pigment dispersion liquids (P-2) and (P-3) was obtained in the same manner as in Production Example 4 except that the formulation composition was as shown in Table 1 below. The formulation composition shown in Table 1 is based on the solid content mass of each component.

TABLE 1

| | | Production Examples | | |
|---|---|---|---|---|
| | | 4 | 5 | 6 |
| Name of pigment dispersion paste | | P-1 | P-2 | P-3 |
| Color pigment | R5000 (Note 1) | 0.2 | 1.5 | 0.1 |
| | M179 (Note 2) | | | 0.2 |
| | B5206M (Note 3) | | | 0.2 |

R5000 (Note 1): carbon black pigment, trade name "RAVEN 5000 ULTRA III BEADS", available from COLUMBIAN CARBON CO., M179 (Note 2): perylene maroon pigment, trade name "MAROON 179 229-6438", available from SUN CHEMICAL CORPORATION, B5206M (Note 3): phthalocyanine blue pigment, trade name "BLUE 5206M", available from Dainichiseika Color & Chemicals Mfg. Co., Ltd.

Productions of Effect Pigment Dispersion Liquids (P-4) to (P-6)

Production Example 7

An effect pigment dispersion liquid (P-5) was obtained by uniformly mixing in a stirring mixing vessel 10.8 parts (a solid content of 8 parts) of "GX-3100" (trade name, aluminum pigment paste, available from Asahi Kasei Metals Corporation, a metal content of 74%), 35 parts of 2-ethyl-1-hexanol, 8 parts (a solid content of 4 parts) of the phosphate group-containing resin solution (R-3) obtained in Production Example 3, and 0.2 parts of 2-(dimethylamino)ethanol.

Production Examples 8 to 9

Each of effect pigment dispersion liquids (P-5) and (P-6) was obtained in the same manner as in Production Example 7 except that the formulation composition was as shown in Table 2 below. The formulation composition shown in Table 2 is based on the solid content mass of each component.

TABLE 2

| | | Production Examples | | |
|---|---|---|---|---|
| | | 7 | 8 | 9 |
| Name of effect pigment dispersion liquid | | P-4 | P-5 | P-6 |
| Effect pigment | "GX-3100" | 8.0 | 8.1 | 3.0 |

Productions of Aqueous First Colored Paints (X-1) to (X-5)

Production Example 10

The following were uniformly mixed: 61.2 parts of the pigment dispersion paste (P-1) obtained in Production Example 4, 19 parts of the effect pigment dispersion liquid (P-4) obtained in Production Example 7, 44.4 parts (a solid content of 20 parts) of aqueous acrylic resin dispersion (R-1) obtained in Production Example 1, 60 parts (a solid content of 21 parts) of "UCOAT UX-8100" (trade name, urethane emulsion, available from Sanyo Chemical Industries, Ltd., a solid content of 35%), and 37.5 parts (a solid content of 30 parts) of "Cymel 325" (trade name, a melamine resin, available from Nihon Cytec Industries Inc., a solid content of 80%). To the resulting mixture were then added "UH-752" (trade name, available from ADEKA Corporation, a thickener), 2-(dimethylamino)ethanol, and deionized water, and an aqueous first colored paint (X-l) with pH 8.0, a paint solid content of 25%, and a viscosity of 3000 mPa·s when measured at 20° C. using a B-type viscometer at a rotational speed of 6 rpm.

Production Examples 11 to 14

Each of aqueous first colored paints (X-2) to (X-5) with a viscosity of 3000 mPa·s when measured at 20° C. using a B-type viscometer at a rotational speed of 6 rpm was obtained in the same manner as in Production Example 10 except that the formulation composition was as shown in Table 3 below.

TABLE 3

| | Production Examples | | | | |
|---|---|---|---|---|---|
| | 10 | 11 | 12 | 13 | 14 |
| Name of first colored paint | X-1 | X-2 | X-3 | X-4 | X-5 |
| Name of pigment dispersion paste | P-1 | P-2 | P-3 | P-2 | |
| Name of effect pigment dispersion liquid | P-4 | P-5 | P-6 | | P-4 |

Production of Aqueous Acrylic Resin Dispersion (R-4)

Production Example 15

To a reaction vessel equipped with a thermometer, a thermostat, a stirrer, a reflux condenser, and a dripping device were placed 154 parts of deionized water and 0.52 parts of "AQUALON KH-10" and mixed by stirring in a nitrogen stream, and the temperature was raised to 80° C. Then, 1% of a total amount of a monomer emulsion (1) described below and 5.3 parts of a 6% ammonium persulfate aqueous solution were introduced into the reaction vessel, and the reaction vessel was maintained at 80° C. for 15 minutes. The remaining monomer emulsion (1) was added dropwise over 3 hours into the reaction vessel maintained at the same temperature. After completion of the dropwise addition, the mixture was aged for 1 hour. A monomer emulsion (2) described below was then added dropwise over one hour, and the mixture was aged for one hour. Then, while 40 parts of a 5% dimethylethanolamine aqueous solution was gradually added to the reaction vessel, the mixture was cooled to 30° C. The mixture was discharged while the mixture was filtered with a 100-mesh nylon cloth, and an aqueous acrylic resin dispersion (R-4) with a solid concentration of 28% was obtained. The resulting aqueous acrylic resin dispersion (R-4) had a hydroxyl value of 25 mg KOH/g and an acid value of 33 mg KOH/g.

Monomer emulsion (1): A monomer emulsion (1) was obtained by mixing and stirring 42 parts of deionized water, 0.72 parts of "AQUALON KH-10", 2.1 parts of methylenebisacrylamide, 2.8 parts of styrene, 16.1 parts of methyl methacrylate, 28 parts of ethyl acrylate, and 21 parts of n-butyl acrylate.

Monomer emulsion (2): A monomer emulsion (2) was obtained by mixing and stirring 18 parts of deionized water, 0.31 parts of "AQUALON KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

Production of Acrylic Resin Solution (R-5)

Production Example 16

To a typical acrylic resin reaction vessel equipped with a stirrer, a thermometer, and a reflux condenser was placed 48 parts of ethylene glycol monobutyl ether, heated and stirred, and maintained at 110° C. Into this was added dropwise over 3 hours a mixture composed of 10 parts of styrene, 40 parts of methyl methacrylate, 25 parts of n-butyl methacrylate, 10 parts of 2-hydroxyethyl methacrylate, 3 parts of methacrylic acid, 5 parts (a solid content, dissolved in 10 parts of deionized water and blended) of N,N-dimethylaminoethyl methacrylate, 10 parts of "NF Bisomer PEM 6E" (available from DKS Co. Ltd., trade name, poly(ethylene glycol) monomethacrylate, a molecular weight of about 350), 4 parts of azobisisobutyronitrile, and 20 parts of isobutyl alcohol. After completion of the dropwise addition, the mixture was aged at 110° C. for 30 minutes, and then an additional catalyst mixed solution composed of 25 parts of ethylene glycol monobutyl ether and 0.5 parts of azobisisobutyronitrile was added dropwise over one hour. The mixture was then aged at 110° C. for one hour, then cooled, and an acrylic resin solution (R-5) with a solid content of 50% was obtained. The acrylic resin solution (R-5) had a hydroxyl value of 43 mg KOH/g and a weight average molecular weight of about 20000.

Production of Color Pigment Dispersion Liquid (P-7)

Production Example 17

19.4 parts (a solid content of 9.7 parts) of the acrylic resin solution (R-5) obtained in Production Example 16, 5.7 parts of "RAVEN 5000 ULTRA III BEADS" (trade name, a carbon black pigment, available from COLUMBIAN CARBON CO.), and 74.9 parts of deionized water were mixed and dispersed with a paint shaker for 2 hours, and a color pigment dispersion liquid (P-7) with a solid content of 15.4% was obtained.

Productions of Aqueous Second Colored Paints (Y-1) to (Y-11)

Production Example 18

The following were added to a stirring mixing vessel, stirred and mixed, and an aqueous second colored paint (Y-1) was adjusted: 50.58 parts of deionized water, 0.25 parts (a solid content of 0.13 parts) of "Surfynol 104A" (trade name, acetylene diol-based wetting agent, available from Air Products, Inc., a solid content of 50%, an internal solvent of 2-ethylhexanol), 11.13 parts (a solid content of 1.11 parts) of "Hydroshine WS-3001" (trade name, vapor-deposited aluminum flake pigment for water-borne coatings, available from ECKART GmbH, a solid content of 10%, an internal solvent of isopropanol, an average particle size D50 of 13 μm, a thickness of 0.05 μm, the surface is silica-treated), 0.69 parts (a solid content of 0.37 parts) of "Aluminum Paste EMERAL EMR-D4670" (trade name, Toyo Aluminum K.K., an aluminum pigment, a solid content of 54%), 25.29 parts (a solid content of 0.51 parts) of "Rheocrysta" (trade name, available from DKS Co. Ltd., a cellulose nanofiber, a solid content of 2%), 2.22 parts (a solid content of 0.62 parts) of the aqueous acrylic resin dispersion (R-4) obtained in Production Example 15, 0.58 parts of the color pigment dispersion liquid (P-7) obtained in Production Example 17, 0.34 parts (a solid content of 0.13 parts) of ("TINUVIN 479-DW(N)" (trade name, available from BASF, an ultraviolet absorber, a solid content of 40%), 0.22 parts (a solid content of 0.11 parts) of "TINUVIN 123-DW (N)" (trade name, available from BASF, a light stabilizer, a solid content of 50%), 0.25 parts of 2-ethylhexanol, and 8.43 parts of isopropanol. The resulting aqueous second colored paint (Y-1) had a solid content of 3.1 mass % and a paint viscosity "B6 value" of 2250 mPa·s.

Production Examples 19 to 28

Each of aqueous second colored paints (Y-2) to (Y-11) was obtained in the same manner as in Production Example 18 except that the formulation composition was as shown in Table 4 below.

TABLE 4

Numerical values in parentheses indicate solid content

| | | | Production Examples | | | | | |
|---|---|---|---|---|---|---|---|---|
| Production Example No. | | | 18 | 19 | 20 | 21 | 22 | 23 |
| Name of aqueous second colored paint (Y) | | | Y-1 | Y-2 | Y-3 | Y-4 | Y-5 | Y-6 |
| Formulation | Deionized water | | 50.58 | 58.55 | 67.63 | 75.60 | 90.18 | 57.79 |
| | Wetting agent | "Surfinol 104A" | 0.25(0.13) | 0.24(0.12) | 0.19(0.10) | 0.15(0.07) | 0.06(0.03) | 0.24(0.12) |
| | Effect pigment (y3) | "Hydroshine WS-3001" | 11.13(1.11) | 5.93(0.59) | 3.83(0.38) | 2.24(0.22) | 0.62(0.06) | 6.01(3.25) |
| | | "Aluminum Paste EMERAL EMR-D-1670" | 0.69(0.37) | 0.37(0.20) | 0.24(0.13) | 0.14(0.07) | 0.01(0.02) | |
| | Viscosity modifier (y1) | "Rheocrysta" | 25.29(0.51) | 23.74(0.47) | 19.14(0.38) | 14.92(0.30) | 6.21(0.12) | 24.35(0.49) |
| | Aqueous resin dispersion | Aqueous Acrylic resin dispersion (R-4) | 2.22(0.62) | 2.20(0.62) | 1.77(0.50) | 1.38(0.39) | 0.59(0.17) | 2.14(0.60) |
| | Color pigment dispersion liquid (P-8) Dispersed resin | Acrylic resin solution (R-5) | 0.11(0.06) | 0.06(0.03) | 0.04(0.02) | 0.02(0.01) | 0.007(0.004) | 0.11(0.06) |
| | Color pigment (y2) | "RAVEN 5000 ULTRA III BEADS" | 0.03(0.03) | 0.02(0.02) | 0.01(0.01) | 0.007(0.007) | 0.002(0.002) | 0.03(0.03) |
| | Solvent | Deionized water | 0.44 | 0.23 | 0.15 | 0.09 | 0.03 | 0.43 |
| | Ultraviolet absorber | "TINUVIN 479-DW (N)" | 0.34(0.13) | 0.32(0.13) | 0.26(0.10) | 0.20(0.08) | 0.08(0.03) | 0.32(0.13) |
| | Light stabilizer | "TINUVIN 123-DW (N)" | 0.22(0.11) | 0.21(0.11) | 0.17(0.09) | 0.13(0.07) | 0.06(0.03) | 0.22(0.11) |
| | Solvent | 2-Ethylhexanol | 0.25 | 0.24 | 0.19 | 0 15 | 0.06 | 0.24 |
| | | Isopropyl alcohol | 8.43 | 7.91 | 6.38 | 4.97 | 2.07 | 8.12 |
| Properties | Solid content (mass %) | | 3.1 | 2.3 | 1.7 | 1.2 | 0.5 | 4.8 |
| | Paint viscosity "B6 value" (mPa · s) | | 2250 | 2295 | 2160 | 1575 | 1350 | 2700 |
| | Content of color pigment (y2) per 100 parts by mass of total solid content of aqueous second colored paint (Y) | | 1.1 | 0.8 | 0.7 | 0.6 | 0.4 | 0.7 |
| | Content of effect pigment (y3) per 100 parts by mass of total solid content of aqueous second colored paint (Y) | | 48.2 | 34.7 | 30.0 | 24.4 | 17.6 | 67.9 |
| | Total content of color pigment (y2) and effect pigment (y3) per 100 parts by mass of total solid content of aqueous second colored paint (Y) | | 49.3 | 35.5 | 30.7 | 25.0 | 18.0 | 68.6 |

TABLE 5

Numerical values in parentheses indicate solid content

| | | | Production Examples | | | | |
|---|---|---|---|---|---|---|---|
| Production Example No. | | | 24 | 25 | 26 | 27 | 28 |
| | Name of aqueous second colored paint (Y) | | Y-7 | Y-8 | Y-9 | Y-10 | Y-11 |
| Formulation | Deionized water | | 59.04 | 50.97 | 46.43 | 59.22 | 35.45 |
| | Wetting agent | "Surfinol 104A" | 0.22(0.11) | 0.31(0.15) | 0.35(0.17) | 0.22(0.11) | 0.82(0.41) |
| | Effect pigment (y3) | "Hydroshine WS-3001" "Aluminum Paste EMERAL EMR-D-4670" | 8.14(4.39) | 3.78(2.04) | 2.15(1.16) | 8.20(4.43) | 1.16(0.58) |
| | Viscosity modifier (y1) | "Rheocrysta" | 21.97(0.44) | 30.58(0.61) | 34.83(0.70) | 22.15(0.44) | 40.90(0.82) |
| | Aqueous resin dispersion | Aqueous acrylic resin dispersion (R-4) | 1.83(0.51) | 2.83(0.79) | 3.31(0.93) | 2.10(0.59) | 3.90(1.09) |
| | Color pigment dispersion liquid (P-8) — Dispersed resin | Acrylic resin solution (R-5) | 0.15(0.07) | 0.07(0.03) | 0.04(0.02) | | 0.02(0.01) |
| | Color pigment dispersion liquid (P-8) — Color pigment (y2) | "RAVEN 5000 ULTRA III BEADS" | 0.04(0.04) | 0.02(0.02) | 0.01(0.01) | | 0.004(0.004) |
| | Color pigment dispersion liquid (P-8) — Solvent | Deionized water | 0.58 | 0.27 | 0.15 | | 0.07 |
| | Ultraviolet absorber | "TINUVIN 479-DW (N)" | 0.29(0.12) | 0.41(0.16) | 0.46(0.19) | 0.30(0.12) | 0.55(0.22) |
| | Light stabilizer | "TINUVIN 123-DW (N)" | 0.20(0.10) | 0.27(0.14) | 0.31(0.15) | 0.20(0.10) | 0.36(0.18) |
| | Solvent | 2-Ethylhexanol | 0.22 | 0.31 | 0.35 | 0.22 | 0.82 |
| | | Isopropyl alcohol | 7.32 | 10.19 | 11.61 | 7.38 | 16.36 |
| Properties | Solid content (mass %) | | 5.8 | 4.0 | 3.3 | 5.8 | 3.3 |
| | Paint viscosity "B6 value" (mPa · s) | | 2385 | 2925 | 3240 | 2565 | 2550 |
| | Content of color pigment (y2) per 100 parts by mass of total solid content of aqueous second colored paint (Y) | | 0.8 | 0.5 | 0.3 | 0.0 | 0.2 |
| | Content of effect pigment (y3) per 100 parts by mass of total solid content of aqueous second colored paint (Y) | | 75.9 | 51.6 | 34.9 | 76.5 | 17.5 |
| | Total content of color pigment (y2) and effect pigment (y3) per 100 parts by mass of total solid content of aqueous second colored paint (Y) | | 76.7 | 52.1 | 35.2 | 76.5 | 17.7 |

Preparation of Test Sheet

Example 1

The aqueous first colored paint (X-1) produced in Production Example 10 was electrostatically applied using a rotary atomization-type bell-shaped coater on the object to be coated produced in [1] described above to give a cured film thickness of 20 μm and allowed to stand for 3 minutes, and an uncured first colored coating film was formed.

The aqueous second colored paint (Y-1) prepared in Production Example 18 was then applied on the uncured first colored coating film to give a dry coating film thickness of 0.5 μm using a Robot Bell available from ABB under conditions of a booth temperature of 23° C. and a humidity of 68%. The coated object was allowed to stand for three minutes, then pre-heated at 80° C. for three minutes, and a second colored coating film was formed.

Then, a clear paint "KINO6510" (trade name: available from Kansai Paint Co., Ltd., a hydroxyl group/isocyanate group curable acrylic resin-urethane resin-based two-component organic solvent-based paint) was applied on the uncured second colored coating film to give a dry coating film thickness of 35 μm using a Robot Bell available from ABB under conditions of a booth temperature of 23° C. and a humidity of 68%, and a clear coating film was formed. After the application, the object was allowed to stand at room temperature for 7 minutes, then heated at 140° C. for 30 minutes using an inside of a hot air circulation drying furnace to dry multilayer coating films simultaneously, and a test sheet was formed.

Here, the dry coating film thickness of the effect coating film was calculated from the following equation. The same applies to the following examples.

$$x=sc/sg/S*10000$$

x: Film thickness [μm]

sc: Coating solid content [g]

sg: Specific gravity of coating film [g/cm$^3$]

S: Evaluated surface area [cm$^2$] of the coating solid content

Examples 2 to 16 and Comparative Examples 1 to 6

Test sheets were obtained all in the same manner as in Example 1 except that the paints and film thicknesses were as described in Table 5.

Evaluation of First Colored Coating Film

Average value (R(X)) of light reflectance (110°) of first colored coating film at wavelength of 400 nm or longer and 700 nm or shorter: The aqueous first colored paints (X-1) to (X-5) each were applied on the object to be coated produced in [1] described above to give a cured film thickness of 20 μm using a mini bell-shaped rotary electrostatic coater under conditions of a booth temperature of 23° C. and a humidity of 68%. The coated object was then allowed to stand at room temperature for three minutes, then pre-heated at 80° C. for three minutes, and an uncured first colored coating film was formed. Then, a clear paint "KINO6510" (trade name: available from Kansai Paint Co., Ltd., a hydroxyl group/isocyanate group-curable acrylic resin-urethane resin-based two-component organic solvent-based paint) was applied on the uncured first colored coating film to give a dry coating film thickness of 35 μm using a Robot Bell available from ABB under conditions of a booth temperature of 23° C. and a humidity of 68%, and a clear coating film was formed. After the application, the coated object was allowed to stand at room temperature for 7 minutes and then heated at 140°

C. for 30 minutes using an inside of a hot air circulation drying furnace. Then, the average value (R(X)) of light reflectance (110°) of the first colored coating film at a wavelength of 400 nm or longer and 700 nm or shorter was obtained, using an "MA-68II" (trade name, available from X-Rite, Incorporated, a multi-angle spectrophotometer), by irradiating the surface to be measured with measuring light at an angle of 45° to the axis perpendicular to the surface to be measured and measuring light reflectance at a wavelength range of 400 nm or longer and 700 nm or shorter for light received at an angle of 110° from the specular reflection angle to the direction of the measuring light, and calculating the average value. Evaluation results are collectively shown in Table 5.

Evaluation of Second Colored Coating Film

Average value of light transmittance of second colored coating film at a wavelength of 400 nm or longer and 700 nm or shorter: Each of the aqueous second colored paints (Y-1) to (Y-11) each was applied on an OHP sheet to give a cured film thickness described in Table 5 using a mini bell-shaped rotary electrostatic coater under conditions of a booth temperature of 23° C. and a humidity of 68%. The coated OHP sheet was allowed to stand at room temperature for 3 minutes and heated at 140° C. for 30 minutes in a hot air circulation drying furnace. The OHP sheet was then evaluated using a "UV-2700" (trade name, available from Shimadzu Corporation), and an average value of the light transmittance at a wavelength of 400 nm or longer and 700 nm or shorter was obtained. Evaluation results are collectively shown in Table 5.

Coating Film Evaluation

The coating film was evaluated by the following methods for each test sheet obtained as described above, and the results are shown in Table 5.

The average value (R(S)) of light reflectance (110°) of multilayer coating film of each test sheet at wavelength of 400 nm or longer and 700 nm or shorter was obtained, using an "MA68II" (trade name, available from X-Rite, Incorporated, a multi-angle spectrophotometer), by irradiating each test sheet with measuring light at an angle of 45° to the axis perpendicular to the surface to be measured and measuring light reflectance at a wavelength range of 400 nm or longer and 700 nm or shorter for light received at an angle of 110° from the specular reflection angle to the direction of the measuring light, and calculating the average value.

In addition, the difference |R(X)−R(S)| between the average value (R(X)) of light reflectance (110°) of the first colored coating film at a wavelength of 400 nm or longer and 700 nm or shorter and the average value (R(S)) of light reflectance (110°) of the multilayer coating film at a wavelength of 400 nm or longer and 700 nm or shorter is also collectively described in Table 5.

Nonuniformity: Each test sheet was visually observed from different angles, and the appearance of the coating film was evaluated according to the following criteria. "Good" shall be acceptable.

Excellent: No nonuniformity is observed with extremely excellent coating film appearance.

Good: Almost no nonuniformity is observed with extremely excellent coating film appearance.

Poor: Nonuniformity is considerably or significantly observed with poor coating film appearance.

60° Specular gloss (60° gloss): Each test sheet was measured for a 60° gloss value using a gloss meter (micro-TRI-gloss, available from BYK-Gardner). Higher values are better. A value of 115 or higher shall be acceptable.

Flip-flop value: a numerical value indicating the magnitude of the change in lightness due to the observation angle and calculated from the equation below. A larger number indicates superior metallic luster. A number of 2.2 or greater shall be acceptable.

$$\text{Flip-flop value} = 60° \text{ gloss/lightness } L^*(45°) \text{ value } (*)$$

(*) Lightness L* (45°): The lightness L*(45°) value represents lightness L* in the L*C*h color system, the lightness L* being measured using a multi-angle spectrophotometer "MA-68II" (trade name, available from X-Rite, Incorporated) by irradiating the surface to be measured with measuring light at an angle of 45° to the axis perpendicular to the surface to be measured and measuring light received at an angle of 45° from the specular reflection angle to the direction of the measuring light.

TABLE 6

| | Examples | | | | | | | |
|---|---|---|---|---|---|---|---|---|
| | 1 | 2 | 3 | 4 | 5 | 6 | 7 | 8 |
| Name of aqueous first colored paint (X) | X-1 | X-1 | X-1 | X-1 | X-3 | X-3 | X-3 | X-2 |
| Average value (R(X)) (%) of light reflectance (110°) of first colored coating film at wavelength of 400 nm or longer and 700 nm or shorter | 7.0 | 7.0 | 7.0 | 7.0 | 6.1 | 6.1 | 6.1 | 2.0 |
| Name of aqueous second colored paint (Y) | Y-1 | Y-1 | Y-1 | Y-2 | Y-3 | Y-4 | Y-5 | Y-6 |
| Film thickness (μm) of second colored coating film | 0.5 | 0.8 | 1.0 | 0.5 | 0.5 | 1.0 | 1.5 | 0.5 |
| Average value (%) of light transmittance of second colored coating film at wavelength of 400 nm or longer and 700 nm or shorter | 0.08 | 0.01 | 0.00 | 0.15 | 0.12 | 0.08 | 0.06 | 0.17 |
| Average value (R(S)) (%) of light reflectance (110°) of multilayer coating film at wavelength of 400 nm or longer and 700 nm or shorter | 2.0 | 2.0 | 2.0 | 2.0 | 1.8 | 1.8 | 1.8 | 1.8 |
| Difference \|R(X) - R(S)\| (%) between average valuc (R(X)) of light reflectance (110°) of first colored coating film at wavelength of 400 nm or longer and 700 nm or shorter and average value (R(S)) of light reflectance (110°) of multilayer coating film at wavelength of 400 nm or longer and 700 nm or shorter | 5.0 | 5.0 | 5.0 | 5.0 | 4.3 | 4.3 | 4.3 | 0.2 |
| Nonuniformity | Good | Good | Good | Good | Excellent | Excellent | Excellent | Excellent |
| 60° Specular gloss (60° gloss) | 130 | 136 | 138 | 133 | 131 | 127 | 119 | 131 |
| Lightness L* (45°) | 39.4 | 36.7 | 34.1 | 39.1 | 42.3 | 43.8 | 47.6 | 37.4 |
| Flip-flop value | 3.3 | 3.7 | 4.0 | 3.4 | 3.1 | 2.9 | 2.5 | 3.5 |

TABLE 7

| | Examples | | | | | | | |
|---|---|---|---|---|---|---|---|---|
| | 9 | 10 | 11 | 12 | 13 | 14 | 15 | 16 |
| Name of aqucous first colored paint (X) | X-2 | X-2 | X-2 | X-1 | X-2 | X-2 | X-2 | X-2 |
| Average value (R(X)) (%) of light reflectance (110°) of first colored coating film at wavelength of 400 nm or longer and 700 nm or shorter | 2.0 | 2.0 | 2.0 | 7.0 | 2.0 | 2.0 | 2.0 | 2.0 |
| Name of aqueous second colored paint (Y) | Y-6 | Y-6 | Y-7 | Y-8 | Y-9 | Y-9 | Y-9 | Y-9 |
| Film thickness (μm) of second colored coating film | 1.0 | 1.5 | 0.5 | 0.5 | 2.5 | 1.5 | 1.0 | 0.5 |
| Average value (%) of light transmittance of second colored coating film at wavelength of 400 nm or longer and 700 nm or shorter | 0.05 | 0.01 | 0.14 | 0.21 | 0.09 | 0.16 | 0.20 | 0.38 |
| Average value (R(S)) (%) of light reflectance (110°) of multilayer coating film at wavelength of 400 nm or longer and 700 nm or shorter | 1.8 | 1.8 | 1.8 | 2.0 | 1.8 | 1.8 | 1.8 | 1.8 |
| Difference \|R(X) - R(S)\| (%) between average value (R(X)) of light reflectance (110°) of first colored coating film at wavelength of 400 nm or longer and 700 nm or shorter and average value (R(S)) of light reflectance (110°) of multilayer coating film at wavelength of 400 nm or longer and 700 nm or shorter | 0.2 | 0.2 | 0.2 | 5.0 | 0.2 | 0.2 | 0.2 | 0.2 |
| Nonuniformity | Excellent | Excellent | Excellent | Good | Excellent | Excellent | Excellent | Excellent |
| 60° Specular gloss (60° gloss) | 134 | 127 | 130 | 116 | 127 | 125 | 123 | 121 |
| Lightness L* (45° C.) | 36.4 | 39.6 | 37.1 | 48.3 | 41.0 | 43.1 | 43.9 | 46.5 |
| Flip-flop value | 3.7 | 3.2 | 3.5 | 2.4 | 3.1 | 2.9 | 2.8 | 2.6 |

TABLE 8

| | Comparative Examples | | | | | |
|---|---|---|---|---|---|---|
| | 1 | 2 | 3 | 4 | 5 | 6 |
| Name of aqueous first colored paint (X) | X-4 | X-5 | X-2 | X-1 | X-2 | X-2 |
| Average value (R(X)) (%) of light reflectance (110°) of first colored coating film at wavelength of 400 nm or longer and 700 nm or shorter | 0.2 | 7.2 | 2.0 | 7.0 | 2.0 | 2.0 |
| Name of aqueous second colored paint (Y) | Y-6 | Y-6 | Y-10 | Y-6 | Y-6 | Y-11 |
| Film thickness (μm) of second colored coating film | 1.0 | 1.0 | 1.0 | 1.0 | 5.0 | 1.0 |
| Average value (%) of light transmittance of second colored coating film at wavelength of 400 nm or longer and 700 nm or shorter | 0.05 | 0.05 | 0.05 | 0.05 | 0.00 | 1.10 |
| Average value (R(S)) (%) of light reflectance (110°) of multilayer coating film at wavelength of 400 nm or longer and 700 nm or shorter | 1.8 | 1.8 | 2.0 | 1.8 | 1.9 | 1.9 |
| Difference \|R(X) - R(S)\| (%) between average value (R(X)) of light reflectance (110°) of first colored coating film at wavelength of 400 nm or longer and 700 nm or shorter and average value (R(S)) of light reflectance (110°) of multilayer coating film at wavelength of 400 nm or longer and 700 nm or shorter | 1.6 | 5.4 | 0.0 | 5.2 | 0.1 | 0.1 |
| Nonuniformity | Poor | Poor | Poor | Poor | Good | Good |
| 60° Specular gloss (60° gloss) | 130 | 130 | 133 | 131 | 127 | 100 |
| Lightness L* (45°) | 37.0 | 41.2 | 38.1 | 36.6 | 66.8 | 36.8 |
| Flip-flop value | 3.5 | 3.2 | 3.5 | 3.6 | 1.9 | 2.7 |

As shown in the tables above, according the method of the present invention, a multilayer coating film having reduced nonuniformity and exhibiting excellent luster and high flip-flop properties can be formed. Although embodiments and examples of the present invention have been specifically described above, the present invention is not limited to the embodiments described above, and various modifications based on the technical idea of the present invention are possible. For example, an aluminum pigment and/or a vapor-deposited metal flake pigment were/was used as the effect pigment(s) in the examples, but from the description of the present specification, such as a description of the above examples, using a light interference pigment instead of or in addition to an aluminum pigment and/or a vapor-deposited metal flake pigment can also provide a multilayer coating film having reduced nonuniformity and exhibiting excellent luster and high flip-flop properties (thus exhibiting excellent pearly luster) in the same manner as described above.

The invention claimed is:

1. A method of forming a multilayer coating film, comprising:

(1) applying an aqueous first colored paint (X) comprising a color pigment (x1), an effect pigment (x2) and an acrylic resin on an object to be coated to form a first colored coating film;

(2) applying an aqueous second colored paint (Y) comprising a viscosity modifier (y1), a color pigment (y2), an effect pigment (y3) and an aqueous acrylic resin dispersion on the first colored coating film to form a second colored coating film;

(3) applying a clear paint (Z) on the second colored coating film to form a clear coating film; and (4) heating the first colored coating film formed in step (1), the second colored coating film formed in step (2), and the clear coating film formed in step (3) simultaneously to cure the coating films, wherein a solid content of the aqueous second colored paint (Y) is in a range of 0.1 to 6 mass %, a dry film thickness of the second colored coating film is in a range of 0.2 to 3.0 μm, an average value of light transmittance of the second colored coating film at a wavelength of 400 nm or longer and 700 nm or shorter is 1% or lower, and a difference |R(X)−R(S)| between an average value (R(X)) of light reflectance (110°) of the first colored coating film at a wavelength of 400 nm or longer and 700 nm or shorter and an average value (R(S)) of light reflectance (110°) of the multilayer coating film at a wavelength of 400 nm or longer and 700 nm or shorter is 5% or lower.

2. The method of forming the multilayer coating film according to claim 1, wherein the effect pigment (x2) in the aqueous first colored paint (X) comprises an aluminum pigment.

3. The method of forming the multilayer coating film according to claim 1, wherein the viscosity modifier (y1) is a cellulose nanofiber.

4. The method of forming the multilayer coating film according to claim 1, wherein a content of the color pigment (y2) in the aqueous second colored paint (Y) is in a range of 0.1 to 5 parts by mass per 100 parts by mass of a total solid content of the aqueous second colored paint (Y).

5. The method of forming the multilayer coating film according to claim 1, wherein the effect pigment (y3) in the aqueous second colored paint (Y) comprises an aluminum pigment and/or a vapor-deposited metal flake pigment.

6. The method of forming the multilayer coating film according to claim 1, wherein the average value (R(X)) of light reflectance (110°) of the first colored coating film at a wavelength of 400 nm or longer and 700 nm or shorter is 0.5% to 20%.

* * * * *